Patented Apr. 5, 1927.

1,623,222

UNITED STATES PATENT OFFICE.

JOHN FREDRICK WERDER, OF CLEVELAND, OHIO.

ABRASIVE COMPOUND.

No Drawing. Application filed March 6, 1926. Serial No. 92,943.

This invention relates to improvements in abrasive compounds for use in the grinding of valves of gas engines, pumps and any and all other work requiring the use of an abrasive compound.

It has heretofore been proposed to prepare such compounds entirely free from oil and containing a starch binder; and to incorporate in such compounds non-drying and non-freezing ingredients. Such compounds are set forth in my Patents No. 1,353,197 granted September 21, 1920, and No. 1,534,196 granted April 21, 1925. It has been found, when it was sought to incorporate the non-freezing and non-drying ingredients such as calcium chloride in an abrasive compound employing starch paste, that the cooked starch mixture became a syrupy, sticky mass which appreciably retarded the action of the abrasive.

The present invention relates to a method of combining such a non-freezing compound in an abrasive having a binder derived from starch, in which such deleterious effects are avoided.

According to this invention a farinaceous substance such as starch is treated with alkali, the alkali is neutralized, and the mass is brought to powder form. Cold water paste as found on the market is such a product: or it may be made up locally for example as follows:

Two and one-half ounces of sulfate of ammonia are dissolved in one and one-half pints of cold water, and filtered. This solution is then poured into one and one-half pounds of wheat flour, and the mass beaten into a smooth batter. One and one-fourth ounces of caustic soda are separately dissolved in three pints of water by boiling. This boiling solution is then poured over the batter, and the mass stirred until thickened. It is then placed in a solution comprising two fluid ounces of hydrofluoric acid in two quarts of water, and the mixture boiled until homogeneous. The hydrofluoric acid acts principally as a neutralizing agent. It is then made up thick, dried and ground. The resultant product may be called soluble starch powder, which is hereinafter employed as the name of such a powder which may be mixed with cold water to produce a paste-like substance.

To prepare the abrasive compound from such a soluble starch powder, a solution of calcium choride in water is prepared in the proper proportions to give a non-freezing liquid with a specific gravity of say 1.225 to 1.250 at a temperature of 68° F. The percentage of calcium chloride may be varied greatly by the operator to adapt its strength to his particular needs: for very cold climates with little or no protection from the atmosphere, a strong solution is indicated.

Five parts by weight of pulverized abrasive, such as silicon carbide, crushed steel, garnet, silica, etc., depending upon the particular class of work the compound is to perform, are combined with about eight or ten parts by weight of the calcium chloride solution already prepared. This mixture is kept in constant agitation to prevent the solid material from separating.

In a separate vessel one to five parts of the soluble starch powder are thoroughly mixed with two to ten parts of the dry abrasive. This dry mixture is then poured into the agitated aqueous calcium chloride-abrasive mixture above as rapidly as possible, while the agitation is still continuing. The agitation is then discontinued: If it be continued for any length of time after the dry mixture of soluble starch powder is incorporated, the whole mixture becomes sticky and stringy as set forth above.

If the agitation be continued too long after the soluble starch powder is introduced, a portion of the powder has passed into solution, and causes the stringiness mentioned: In practice it has been found that about 30 to 40 seconds is sufficient to obtain a homogeneous mixture, and yet not bring any substantial quantity of the soluble starch powder into solution.

The compound prepared in this manner possesses all of the admirable cutting qualities of that obtained by my aforesaid Patent 1,353,197, and has the additional advantage of not freezing or drying out. The calcium chloride also performs the function of preventing decomposition or molding of the starch material. The final result is an abrasive compound containing a starch binder, water, abrasive, and calcium chloride which is not syrupy or stringy: obtainable by reason of the very slight stirring or agitation needed.

The mixture becomes stiff as the soluble starch powder goes into solution: and is in excellent form for application to the work.

It is obvious that the proportions and times above indicated may be modified without departing from the spirit of the invention.

I claim:

1. The method of preparing an abrasive compound containing soluble starch powder which comprises mixing the dry abrasive material and dry cold water paste, saturating the dry mixture with an aqueous solution, and stirring for a time sufficient to obtain a homogeneous substance but insufficient to permit substantial solution of the cold water paste.

2. The method of preparing an abrasive compound containing soluble starch powder which comprises mixing the ingredients with agitation for a time insufficient to cause substantial solution of the soluble starch powder.

3. An abrasive compound containing abrasive material and a binder formed from moistened soluble starch powder.

4. An abrasive compound containing abrasive material, moistened soluble starch powder, and a preservative.

5. A homogeneous abrasive compound containing abrasive material, a starch binder, a liquid acting with said starch binder in the cold to produce and maintain a paste, and calcium chloride.

6. The method of preparing an abrasive compound which comprises preparing a dry soluble starch powder, preparing a calcium chloride solution containing suspended abrasive, mixing said dry soluble starch powder with further dry abrasive, pouring said dry mixture into said solution during constant stirring, and interrupting such stirring immediately the mass becomes homogeneous.

7. An abrasive compound containing abrasive material, a soluble starch binder, water and a moisture-retaining substance.

8. An abrasive compound containing abrasive material, a soluble starch binder, water, and a non-freezing protective substance.

In testimony whereof, I affix my signature.

JOHN FREDRICK WERDER.